United States Patent [19]

White et al.

[11] Patent Number: 4,503,214

[45] Date of Patent: Mar. 5, 1985

[54] CONTINUOUS PROCESS FOR PREPARING POLYPHENYLENE OXIDES

[75] Inventors: Dwain M. White, Schenectady; Susan A. Nye, Feura Bush, both of N.Y.

[73] Assignee: General Electric Company, Schenectady

[21] Appl. No.: 600,625

[22] Filed: Apr. 16, 1984

Related U.S. Application Data

[63] Continuation-in-part of Ser. No. 558,404, Dec. 5, 1983, abandoned.

[51] Int. Cl.$^3$ ............................................. C08G 65/44
[52] U.S. Cl. ....................................... 528/212; 526/65; 526/66; 528/214; 528/215; 528/216; 528/217
[58] Field of Search .................... 526/65, 66; 528/212, 528/214–217

[56] References Cited

U.S. PATENT DOCUMENTS

| | | | |
|---|---|---|---|
| 3,306,874 | 2/1967 | Hay | 528/212 |
| 3,789,054 | 1/1974 | Izawa et al. | 526/65 |
| 4,028,341 | 6/1977 | Hay | 528/212 |

FOREIGN PATENT DOCUMENTS

| | | | |
|---|---|---|---|
| 48-45600 | 6/1973 | Japan | 526/65 |
| 55-40613 | 10/1980 | Japan | 526/65 |

*Primary Examiner*—Lester L. Lee
*Attorney, Agent, or Firm*—Leo I. MaLossi; James C. Davis, Jr.; James Magee, Jr.

[57] ABSTRACT

A continuous process for preparing polyphenylene ether resins without removing water is described in which only two continuously vigorously stirred reactors are used with the average residence time in the two reactors being correlated to yield resin having an intrinsic viscosity of at least about 0.35 deciliter/gram.

16 Claims, 1 Drawing Figure

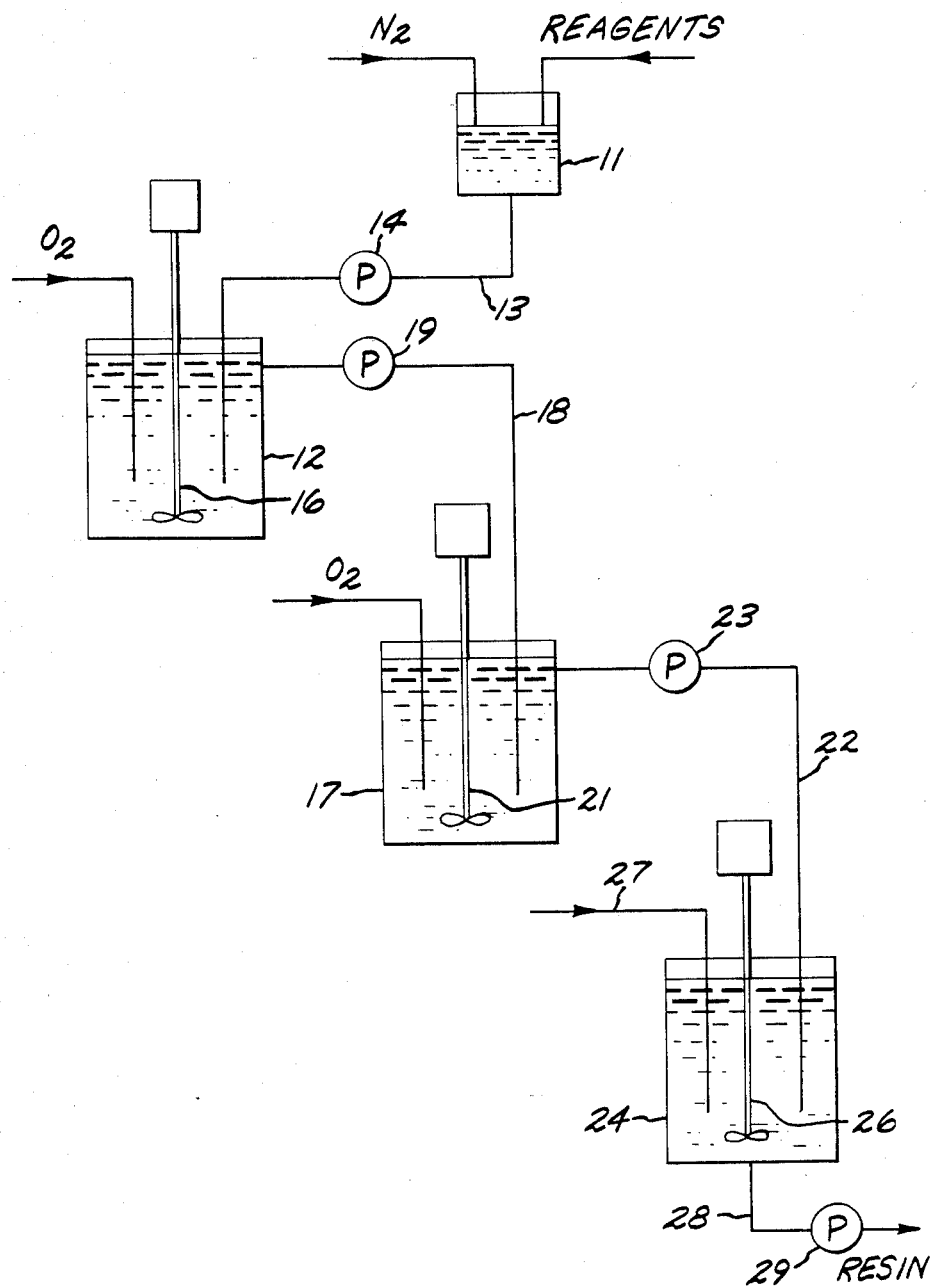

CONTINUOUS PROCESS FOR PREPARING POLYPHENYLENE OXIDES

BACKGROUND OF THE INVENTION

This is a continuation-in-part of pending U.S. patent application Ser. No. 558,404—White, et al., filed Dec. 5, 1983 and now abandoned.

The polyphenylene ethers (or polyphenylene oxides) and processes for their preparation are known in the art and described in numerous publications including Hay, U.S. Pat. No. 3,306,874 (Hay '874) and U.S. Pat. No. 3,306,875 (Hay '875). Other procedures are described in Van Dort, U.S. Pat. No. 3,365,422, Bennett and Cooper, U.S. Pat. Nos. 3,639,656, 3,642,699, 3,733,299, 3,838,102, 3,661,848 and 4,092,294 and Olander, 4,054,553. All of these patents are incorporated herein by reference.

The processes most generally used to produce the polyphenylene oxides involve the self-condensation of a monovalent phenol in the presence of an oxygen-containing gas and a catalyst.

Apparatus arrangements possibly useful in the continuous production of polyphenylene oxides are disclosed in above-noted Hay '874 (three reactors in series), published Japanese patent application No. 80/40613 (three reactors in series) and Japanese Kokai No. 73/45600 (two reactors in series). It is made clear in Hay '874 and in Japanese Kokai No. 73/45600 that water formed as a by-product during the reaction is to be removed. In Japanese No. 80/40613 the catalyst is an N,N'-ethylenebis(salicylideneiminato)manganese ethylenediamine chelate.

The use of pre-mixing of catalyst in both batch and continuous processes in the preparation of polyphenylene oxides is disclosed in pending U.S. patent application Ser. No. 479,057—Mobley, filed Mar. 25, 1983. Two-stage continuous production of polyphenylene oxides wherein the second stage is a reaction system with limited back-mixing is described in U.S. patent application Ser. No. 479,066—Mobley, filed Mar. 25, 1983. Both Mobley applications are assigned to the assignee of this invention and are incorporated by reference.

A two-stage continuous process for the production of polyphenylene ethers is described in U.S. Pat. No. 3,789,054—Izawa, et al. The Izawa, et al. process depends upon the use of polymerization media, that will dissolve the catalyst system and the 2,6-substituted phenols but do not dissolve polyphenylene ethers having a specific viscosity ($\eta$ sp/c) of 0.25 or greater resulting from the polymerization. By using such a polymerization medium together with a high ratio of catalyst-to-phenol (e.g., a range of moles of copper:moles of phenol of about 1:54 to about 1:191 is calculable from the examples) the polymer formed from conversions ranging from 50% to 95% remains in solution in the first reactor and precipitates in the second reactor after completion of the polymerization.

Continuous processes frequently offer lower capital and operating costs and less variance in product quality than batch processes, especially in large-scale production. It is to these objectives that this invention in the continuous production of polyphenylene oxide resins is directed.

The catalyst system used in the practice of the continuous process of this invention for preparing polyphenylene oxide is described in U.S. Pat. No. 4,028,341—Hay (Hay '341) incorporated herein by reference.

Attempts by the inventors herein to use the Hay '341 catalyst system in an arrangement employing three continuous stirred reactors in series to produce polyphenylene oxide by continuous polymerization highlighted catalyst deactivation as a major problem. The low molecular weight products produced were undesirable. Although the presence in the system of water generated during the polymerization was determined to be one cause of the deactivation, this did not constitute a complete explanation, because when this same catalyst system is used in batch production it is not necessary to remove the water phase to be able to produce high molecular weight products.

Removing the water phase (e.g. by centrifugation) is effective and by this expedient high molecular weight polyphenylene oxide has been produced at low catalyst levels in a continuous process using the Hay '341 catalyst system. A significant economic benefit would result, however, if the water removal step could be omitted, since an in-line liquid-liquid centrifuge and accompanying holding tanks represent a large investment. Using such equipment also entails maintenance including, for example, the removal of by-product tetramethyldiphenoquinone (TMDQ) accumulations. Even greater savings could be realized, if the number of continuous stirred tank reactors could be reduced. The term CSTR as used herein is the abbreviation employed for "continuous stirred tank reactor".

Continuous processing of polyphenylene oxides requires the consideration of certain operational characteristics in order to select specific operating features for such processing. Among the operational characteristics are the following:

(1) high monomer (or hydroxyl) concentrations result in lower reaction rate constants,
(2) high monomer concentration produces more TMDQ,
(3) high monomer concentration stabilizes the catalyst (i.e. retards catalyst decomposition),
(4) long resistance time yields more reaction and
(5) long residence time increases hydrolysis of the catalyst.

It is manifest from the above that the particular mode of operation employed must balance many parameters (e.g. residence times, water removal or retention, reaction rate constants, monomer concentration, etc.) in order to produce a resin having a useful intrinsic viscosity at an acceptable cost by a continuous process. In large part, production capability at an acceptable cost depends upon being able to maximize catalyst viability.

The need to focus strongly on maximizing catalyst viability has caused the developers of previous continuous processes for polyphenylene oxides to keep monomer concentration high in the first of any series of CSTR's used and, as well, to keep the average residence times in this first CSTR at values such as will yield a product having an average molecular weight [$\overline{M}_w^{PS}$ determined by gel permeation chromatography (GPC) using polystyrene calibration] in the range of about 1500–3000. Thus, the maximum conversion achieved in the first CSTR in prior art continuous processes has been slightly in excess of 90%.

In sharp contrast to this prior art approach, this invention has shown that, when the catalyst system of Hay '341 is used, the benefits to be realized by using longer residence times in the first CSTR (such as result in a significantly greater average molecular weight for the polyphenylene oxide resin produced in the first CSTR) are far greater than would have been expected, in respect both to the resulting product and to the reduction in equipment and maintenance costs.

DESCRIPTION OF THE INVENTION

In the improvement of this invention only two interconnected CSTR's are used to produce polyphenylene oxide resin as a useful product in a continuous process employing the copper-amine catalyst system described in Hay '341. In this process in which the contents of both reactors are vigorously stirred during oxidative coupling and the average residence time in the first reactor is substantially increased, by correlating the average residence time in the first reactor with the average residence time in the second reactor, resin can be produced in the second reactor having an intrinsic viscosity of at least about 0.35 deciliter/gram (dl/g) and the usual water removal step can be omitted. The value of $\overline{M}_w{}^{PS}$ for the liquid flow passing from the first reactor to the second reactor to be at least 5000; values at least as high as 7000 have been used (the 5000 value is comparable to 94% conversion and the 7000 value is comparable to 96% conversion). The polymer formed remains in solution throughout the residence time thereof in both CSTR's.

The capability afforded by this improved continuous process for producing polyphenylene oxide resins having an average molecular weight of at least about 30,000 without the necessity of removing water is surprising and is directly related to moving contrary to the conventional wisdom by substantially increasing residence time in the first reactor. As a result of this change, operation in the first reactor improved in the following respects:

(a) the rate constant increased due to the decrease in monomer concentration,
(b) more reaction occurred in the first reactor,
(c) neither catalyst stability in general, nor catalyst hydrolysis in particular, became significant problems and
(d) TMDQ by-product generation was reduced.

BRIEF DESCRIPTION OF THE DRAWING

The features of this invention believed to be novel and unobvious over the prior art are set forth with particularity in the appended claims. The invention itself, however, as to the organization, method of operation and objects and advantages thereof, may best be understood by reference to the following description taken in conjunction with the accompanying drawing in which apparatus for the production of polyphenylene oxide by continuous processing according to this invention is schematically represented.

MANNER AND PROCESS OF MAKING AND USING THE INVENTION

The improved process of the invention is broadly applicable to the preparation of polyphenylene ethers of the formula:

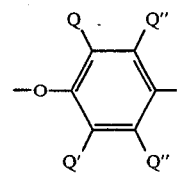

wherein the oxygen ether atom of one repeating unit is connected to the phenylene nucleus of the next repeating unit; Q is a hydrocarbon radical, a halogen radical having at least two carbon atoms between the carbon atoms and the phenyl nucleus, and Q' and Q'' are selected from the same group as Q and, in addition halogen, provided that Q, Q' and Q'' are all free of a tertiary carbon atom.

The preferred polyphenylene ethers that are prepared by the process of the invention are those wherein Q and Q' are hydrocarbon radicals having from 1 to 8 carbon atoms and Q'' are each hydrogen. The especially preferred polyphenylene ethers are those where Q and Q' are methyl and each Q'' is hydrogen.

Typical monohydroxy aromatic compounds (hereinafter sometimes referred to as "phenols" for brevity) useful in the process of this invention are those having the formula

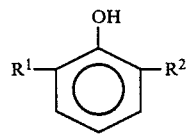

wherein $R^1$ is a lower primary alkyl group and $R^2$ is a lower primary or secondary alkyl group, the word "lower" meaning that it contains up to 7 carbon atoms. Examples of lower primary alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of lower secondary alkyl groups are isopropyl, sec-butyl and 3-pentyl. Preferably, $R^1$ and $R^2$ are straight chain rather than branched. Since the polyphenylene oxides in which $R^1$ and $R^2$ are other than methyl generally have no more desirable properties than those in which $R^1$ and $R^2$ are both methyl, and since 2,6-xylenol is the most readily available and cheapest 2,6-dialkylphenol, its use is preferred. The polyphenylene oxide obtained is then poly(2,6-dimethyl-1, 4-phenylene oxide). Other suitable phenols are disclosed in the Hay—'874, Hay '875 and Hay '341 patents.

As noted hereinabove, the catalyst system employed in the practice of this invention is that described in Hay '341. This catalyst system comprises copper ions, bromine ions, at least one member of a limited class of secondary alkylene diamines and at least one member of a limited class of tertiary monoamines.

The secondary alkylene diamine may be selected from those disclosed in the Hay '341 patent, especially from column 6, line 44, to column 8, line 11. It generally has the formula $R^3NH-R^4-NHR^5$ wherein each of $R^3$ and $R^5$ is a secondary or tertiary alkyl group and $R^4$ is a divalent hydrocarbon group, different from the in-process pre-mix. The purpose of this initial charge is to promote the rapid attainment of steady-state conditions in reactor 12. This initial charge comprises portion A and portion B (see hereinafter) added in that order with the Cu$_2$O/HBr solution being added, when polymerization has started. Quantities shown are for a laboratory scale experiment, but are representative of the proportions desired. The following abbreviations are used:

DBEDA—N,N'-di-t-butylethylenediamine
DMBA—dimethyl-n-butylamine
DBA—di-n-butylamine.

| | Portion A |
|---|---|
| 4 g | Dimer (4-[2,6-dimethylphenoxy]-2,6-xylenol) |
| 0.4 g | DBA |
| 0.12 g | DBEDA |
| 2 ml | DMBA |
| 0.4 ml | Adogen |
| 0.21 ml | Cu$_2$O/HBr Solution (added when polymerization begins) |
| | Sufficient toluene for a total volume of 100 ml |
| | Portion B |
| 36 g | 2,6-xylenol |
| | Sufficient toluene for a total volume of 100 ml. |

When this initial charge (i.e. portions A & B) is provided, it produces a low molecular weight mixture, which has relatively little TMDQ and to which the in-process pre-mix is added.

The preferred composition of the in-process pre-mix is prepared in the following proportions:

| | In-Process Pre-mix |
|---|---|
| 178 g | 2,6-xylenol |
| 1.78 g | DBA (dibutyl amine) |
| 0.558 g | DBEDA (N,N$^1$—di-t-butylethylenediamine) |
| 8.74 ml | DMBA (dimethylbutylamine) |
| 1.78 ml | Adogen 464 1.0 ml Cu$_2$O/HBr Solution (1.18 g Cu$_2$O/10 ml 47% HBr) |
| | Sufficient toluene for a total volume of 892 ml. |

This in-process pre-mix, when made as a batch, is prepared by dissolving the 2,6-xylenol in 600 ml toluene and then adding all of the remaining reagents except the Cu$_2$O/HBr solution. The Cu$_2$O/HBr solution is added, while maintaining the solution under nitrogen for the course of the reaction. A similar procedure is followed in the preparation of portion A, above.

Reaction is initiated in CSTR 12 by the introduction of oxygen (although air or a mixture of air or oxygen and inert gas may be employed) as by sparging, while the contents are vigorously agitated. Any suitable means for agitating can be used, e.g. a motor-driven turbine agitator 16. Pure oxygen is the preferred oxidant.

The heat of reaction is usually removed from CSTR 12 to maintain a constant temperature in the range of about 10°–60° C., usually 20°–55° C. and preferably 30°–40° C. This can be accomplished with conventional means (not shown) e.g., reaction solution can be circulated from the CSTR through external heat exchangers where heat is removed by a cooling fluid; cooling coils internal to the CSTR, or an external cooling jacket can be used.

The pressure in CSTR 12 is typically atmospheric with oxygen being sparged thereinto at one atmosphere. Sub- or superatmospheric pressures can be used, but are seldom if ever necessary.

The amount of oxygen is generally at least the stoichiometric amount needed to react with the phenol to achieve the desired level of conversion. Amounts substantially in excess of stoichiometric can be used, of course; for example, at a 70% molar excess of oxygen the interfacial area between the gas and liquid phases is increased. However, it is generally found that, because high agitation is used less oxygen is required; e.g., at 10% molar excess of oxygen the reaction readily proceeds to the desired degree of conversion.

After the desired residence time the reaction products are moved directly from CSTR 12 to CSTR 17 via line 18 and pump 19 (i.e. without water removal). With CSTR 12 and CSTR 17 being of known volumes, the flow rates of the pumps servicing these reactors, when properly correlated will determine the average residence time in each reactor.

Agitator 21 in tank 17 may be of the same type as agitator 16. The pressure of operation, temperature of operation and degree of agitation in CSTR 17 are essentially the same as those used in the first CSTR. Somewhat less oxygen is necessary, however, since the conversion therein is less than in the first CSTR.

The interrelationship between the average residence times in CSTR 17 and CSTR 12 is critical to achieving the benefits of this invention and may be routinely determinable following the guidelines provided herein.

After a pre-set residence time, the reaction products move via lines 22 and pump 23 to precipitation vessel 24 provided, optionally, with agitator 26. Precipitating agent (e.g. methanol) to separate out the polyphenylene oxide resin is supplied via pipe 27 and resin is removed via line 28 and pump 29 for filtering and drying in the conventional manner. If the reaction product entering vessel 24 is too viscous it may be necessary to add solvent thereto.

Thus, using the apparatus described, the appropriate pre-mixes of copper-amine catalyst and 2,6-xylenol in toluene were introduced into the first CSTR with the oxidative coupling reaction product therefrom being pumped to the second CSTR without the removal of water therefrom. Oxygen was supplied to and distributed in each CSTR as the contents of each was vigorously stirred. A series of runs was made once steady state conditions prevailed in the reactors. For each of the runs described herein the average residence time in the first CSTR was held constant while the average residence time in the second CSTR was changed at approximately 90 minute intervals. In each separate run a different average residence time was used in the first CSTR. This procedure produced data for various combinations of (i.e. correlations between) average residence times in the series-connected pair of CSTR's. The average molecular weight in each reactor was followed by gel permeation chromatography (GPC). The molecular weight in the first CSTR did not vary significantly during each run (TABLE I).

GPC measurements were performed on a Waters Associates, Inc. liquid chromatograph, Model ALC/GPC 244, equipped with $\mu$-Styragel columns in chloroform containing 0.5% ethanol. A series of columns ($10^5$, $10^4$, $10^3$ and 500A) was utilized at a 2.0 ml/min. flow rate. The columns were standardized with polystyrene standards and all molecular weight values are quoted relative to polystyrene.

and wherein at least two and no more than three carbon atoms separate the two amino nitrogen atoms and the carbon atoms to which the amino nitrogens are attached are aliphatic. Preferably, there are only two carbon atoms separating the two amino nitrogens. The two or three carbon atoms separating the amino nitrogens can be either acyclic or cyclic carbon atoms. Typical examples of $R^4$ include ethylene, 1,2- and 1,3-propylene, 1,2-, 1,3- and 2,3-butylene, the various pentylene isomers having from two to three carbon atoms separating the two free valences, phenylethylene, tolylethylene, 2-phenyl-1,2-propylene, cyclohexylethylene, 1,2- or 1,3-cyclohexylene, 1,2-cyclopropylene, 1,2-cyclobutylene and 1,2-cyclopentylene.

Typical examples of $R^3$ and $R^5$ include isopropyl and α-tertiary alkyl groups. The substituents on the α-carbon atoms can be straight or branched chain alkyl, cycloalkyl, aryl or alkaryl. Typical examples of groups $R^3$ and $R^5$ include those set forth in the Hay '341 patent, column 8, lines 2–11, e.g., t-butyl, 2-methyl-2-butyl, etc. The currently preferred secondary alkylene diamine is N,N'-di-t-butylethylenediamine.

The tertiary monoamine can be selected from those disclosed in the Hay '341 patent; specific reference should be made to column 8, lines 12–33. It can be a heterocyclic amine or a trialkylamine characterized by having the amine nitrogen attached to at least two groups which have a small cross-sectional area. In the case of a trialkylamine, it is preferred that at least two of the alkyl groups be methyl with the third being a $C_{1-8}$ primary or $C_{3-8}$ secondary alkyl, and it is more preferred that the third substituent have no more than four carbon atoms. The currently preferred tertiary monoamine is dimethyl-n-butylamine.

A phase transfer catalyst may also optionally be used in the reaction system as a reaction rate promoter. Useful phase transfer catalysts are disclosed in U.S. Pat. No. 3,988,297, hereby incorporated by reference; specific reference is made to column 2, lines 11–26, and column 3, lines 1–23. The currently preferred phase transfer catalyst is Adogen 464 (Aldrich Chemical Co.), which is a methyltrialkylammonium chloride wherein the alkyl groups have from 8 to 10 carbon atoms.

The polymerization medium will consist of one or more solvents keeping the reactants in solution. Typical solvents can be selected from those disclosed in the Hay '874, Hay '875 and Hay '341 patents. The function of the solvent is to provide a liquid phase in which not only the phenol and catalyst system are soluble, but in which the polymer generated remains dissolved throughout the total of the residence times in the two CSTR's. Illustrative solvents are toluene and benzene; other inexpensive and readily available commercial solvents may also be used.

According to the present invention, the oxidative coupling reaction producing the polyphenylene oxide is carried out continuously in two and only two CSTR's. CSTR's are known to be back-mixed reactors. Reference is made to Perry, Chemical Engineers' Handbook, Fourth Edition, p. 19-11 (FIGS. 19-22), and Levenspiel, Chemical Reaction Engineering, Second Edition, p. 98 (FIG. 1c).

The source of copper ion can be any of the cupric or cuprous salts disclosed in the Hay '874 and Hay '875 patents. See, for example, '874 from column 3, line 62, to column 4, line 61. The halide ion is to be bromide, and its source can be any of those disclosed in the Hay '341 patent; particular reference is made to column 8, line 61, to column 9, line 53. For example, it can be an inorganic bromide (except for ammonium bromide, because the ammonium ion can also form a strong complex with copper ions) and can include bromine and hydrogen bromide. Also useful are organic bromine compounds which, under reaction conditions, produce bromide ions. An example thereof is 4-bromo-2,6-xylenol. The only requirement is that the bromine compound be capable of supplying a form of bromide ion, which is soluble in the reaction mixture. If the bromine compound itself is insoluble, it can still be satisfactory if it forms soluble complexes with the amine constituents of the catalyst or produces a soluble product under oxidative coupling conditions. When metal bromides other than the copper bromines are used, the particular metal used is merely one of choice. Since some of these materials (e.g., cobalt) form complexes with amines, suitable adjustments in the amount of amine used may sometimes be necessary. Because of low cost and ready availability, when using a metal bromide often the alkali or alkaline earth metal bromides are used, e.g., sodium bromide. Since hydrogen bromide will react with amines to form an amine hydrobromide salt and bromine will brominate the phenol and simultaneously produce hydrogen bromide, again adjustments in the amount of amine may be necessary in such situations.

The currently preferred bromide source is HBr, which may conveniently be combined with the copper source as a solution of cuprous oxide in aqueous hydrobromic acid.

A typically apparatus arrangement for carrying out the continuous polymerization of the invention is set forth schematically in the drawing. In the arrangement shown the non-gaseous constituents (i.e. phenol, components of the catalyst, solvent and phase transfer catalyst, when used) are pre-mixed in an inert (e.g., nitrogen or helium) atmosphere in vat 11 to form a homogeneous mixture, which is fed to the first CSTR (i.e. CSTR 12) via line 13 and pump 14 during the process. This pre-mixing step in its more general application is disclosed and claimed in the above-noted application Ser. No. 479,057. It is believed that, when premixing in an inert atmosphere is employed, the ingredients of the catalyst interact with each other more efficiently in the absence of oxidant (i.e., oxygen) and in the presence of a high concentration of phenol, resulting in higher conversion and a decrease in amount of catalyst required. Thus, such pre-mixing promotes formation of the actual catalyst species under extremely favorable conditions. However, pre-mixing is not required for the successful practice of this invention.

Pre-mixing may be effected in a batch or continuous operation. When it is a batch operation, the copper and halide ions should be added last in order that they will be solubilized by complex formation with the amines. It is within the scope of the invention to pre-mix and store a large catalyst batch in vat 11, using it as required in the polymerization process. In a continuous pre-mixing operation, no special order of addition is necessary, since each catalyst ingredient is always present in pre-mix vat 11. Under these conditions, a catalyst species is formed which is highly active under oxidative coupling conditions and which retains high activity for a relatively long period of time, thus continuing to promote effective polymerization for the duration of the polymerization process.

At the very start of the process, it is of advantage to charge reactor 12 with a series of ingredients somewhat The flow rate for the inlet and outlet pumps determined the residence times for each CSTR. The pump delivering to the second CSTR was run at a series of different flow rates (e.g. 4.0, 5.0 and 6.0 ml/min) being changed every 90 minutes, thus giving the series of average residence times reported for CSTR #2 in TABLE II.

Although the apparatus shown in the drawing transfers reaction product from CSTR 12 to CSTR 17 by means of a pump, the apparatus can be arranged so that reaction product is supplied by gravity feed via a spill-off conduit from CSTR 12 to CSTR 17 and such an arrangement was, in fact, used in these experiments.

In the experiments reported in TABLES I and II, CSTR #1 and CSTR #2 were open cylindrical vessels equipped with vibromixers, oxygen-inlet tubes, thermometers and water baths. The oxygen flow was maintained at 0.5 scfh for CSTR #1 and at 0.2 scfh for CSTR #2.

CSTR #1 was charged with portion A, the vibromixer and oxygen were turned on and at time $t_o$, addition of portion B and simultaneous introduction of $Cu_2O$/HBr were begun. The temperature of CSTR #1 was maintained at 35° C. with an ice bath. At the end of the addition of portion B, the addition of the in-process pre-mix was begun. At this point, CSTR #2 began filling, the vibromixer and oxygen were turned on and it was maintained at 35° C. with cool water. Both CSTR's were subjected to thorough agitation during conduct of the process. This is particularly important in CSTR #2.

After the runs, the catalyst material actually used in carrying out the runs was used for the conduct of batch runs to determine the extent to which catalyst activity had been depleted. It was found that in spite of the large increase in average residence time in CSTR #1, which would be expected to sharply decrease catalyst viability, polyphenylene oxide was produced of high average molecular weight ($\overline{M}_w^{PS}$ = 7,000) and in substantial yield.

Samples from CSTR #1 were collected with a pasteur pipette and put into a vial with a 10 wt% aqueous solution of sodium ethylenediaminetetraacetic acid ($Na_3EDTA$). The EDTA-chelated the copper and prevented further polymerization. Spectroscopic-grade chloroform was added and the organic phase was analyzed by GPC. Samples from CSTR #2 were collected via the spill-off tube, diluted with toluene and precipitated by adding methanol. The precipitated samples were dried in vacuo at 60° C. overnight. They were then analyzed to determine molecular weights by GPC. Molecular weights are reported relative to polystyrene standards.

TABLE I

| CSTR #1 Avg. Residence Time (min) | CSTR #1 $\overline{M}_w^{PS}$ |
|---|---|
| 20 | 3,000 |
| 24 | 4,000 |
| 30 | 5,000 |
| 34 | 7,000 |
| 38 | 6,000 |
| 40 | 4,000 |

The average molecular weight for the contents of the second CSTR for the various combinations of average residence times in CSTR #1 and CSTR #2 are shown in TABLE II.

TABLE II

| CSTR #1 Avg. Residence Time (min) | $\overline{M}_w^{PS}$ in CSTR #2 for Avg Residence Times In CSTR #2 | | | | |
|---|---|---|---|---|---|
| | 21 min | 25 min | 31 min | 38 min | 43 min |
| 20 | 9,000 | — | — | — | — |
| 24 | 17,000 | 18,000 | 19,000 | — | — |
| 29 | 20,000 | 28,000 | 34,000 | — | — |
| 34 | — | 17,000 | 37,000 | — | — |
| 38 | — | — | — | 24,000 | — |
| 40 | — | — | — | — | 17,000 |

The highest molecular weight value in Table II of 37,000 is an average of samples removed during the run and corresponds to an intrinsic viscosity of about 0.38 dl/g measured in chloroform at 25° C. Commercial polyphenylene oxide resin has a higher intrinsic viscosity (0.45 to 0.50 dl/g), however, recently interest has developed in using lower viscosity polyphenylene oxide (i.e. about 0.35 dl/g) particularly for easy-flow resin compositions of polyphenylene oxide and styrene resins.

As has been noted hereinabove, in general in previous continuous polymerization processes for the production of polyphenylene oxide, the $\overline{M}_w^{PS}$ of the reaction product leaving the first CSTR will be in the 1500–3000 range, which represents a maximum conversion of about 90%. The conventional thinking has been to transfer the reaction product from the first CSTR, when there remains a high enough concentration of hydroxyl ions in the flow to maximize preservation of the catalyst. Also, in such processes the average residence time in the first CSTR is kept short. The data set forth herein shows that, at least with this catalyst system and with the contents of the reactors highly agitated, by using only two CSTR's in series flow and by properly correlating the average residence times for the CSTR's, a surprisingly high average molecular weight (and intrinsic viscosity) can be achieved by actually lengthening the residence time and generating an optimum (and higher) average molecular weight reaction product in CSTR #1. Another noteworthy advantage of this invention, of course, is that the removal of water has been obviated.

Styrene resins for polyphenylene oxide/styrene resin compositions are well known and will comprise at least 25% by weight of units of the formula:

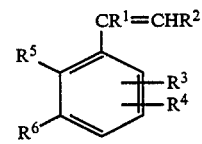

wherein $R^1$ and $R^2$ are selected from the group consisting of lower alkyl or alkenyl groups of from 1 to 6 carbon atoms and hydrogen; $R^3$ and $R^4$ are selected from the group consisting of hydrogen and lower alkyl and alkenyl groups of from 1 to 6 carbon atoms or $R^5$ and $R^6$ may be concatenated together with hydrocarbonyl groups to form a naphthyl group. These compounds are free of any substituent that has a tertiary carbon atom. Styrene is the preferred compound. Compositions of polyphenylene ethers and styrene resins are described in Cizek, U.S. Pat. No. 3,385,435 which is incorporated by reference.

The styrene resins may include units derived from a α,β-unsaturated cyclic anhydride of the formula,

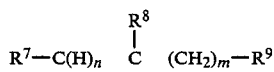

wherein the dotted lines represent a single or a double carbon to carbon bond, $R^7$ and $R^8$ taken together represents a

linkage, $R^9$ is selected from the group consisting of hydrogen, vinyl, alkyl, alkenyl, alkylcarboxylic or alkenyl-carboxylic of from 1 to 12 carbon atoms, n is 1 or 2, depending on the position of the carbon-carbon double bond, and m is an integer of from 0 to about 10. Examples include maleic anhydride, citraconic anhydride, itaconic anhydride, aconitic anhydride, and the like.

Rubber may be used in the preparation of the styrene resins to upgrade the physical properties of these resins according to well known techniques. The rubber employed may be a polybutadiene rubber, butyl rubber, styrene-butadiene rubber, acrylonitrile rubber, ethylene-propylene copolymers, natural rubber, EPDM rubbers, polysulfide rubbers, polyurethane rubbers, epichlorohydrin rubbers and the like.

The styrene resins may be homopolymers or they may comprise 40 to 1 parts by weight of the α,β-unsaturated cyclic anhydride, from 60 to 99 parts by weight of a styrene compound and from 0 to 25 parts, preferably from 5 to 15 parts by weight of rubber. A preferred styrene resin is high-impact rubber-modified polystyrene. An example of a useful high-impact-rubber-modified polystyrene resin is Foster Grant 834 which contains about 8% of polybutadiene rubber.

In the practice of this invention the phenol is generally used in an amount of about 5–60% of total solution weight, preferably 10–40% and most preferably 15–25%. Products which have a commercially desirable molecular weight are most easily obtained using about 20% phenol.

Copper ratios are generally 1 gram mole of copper to about 400–1200 moles of phenol. The molar ratio of bromide to copper ions in the catalyst affects catalyst activity, and a ratio of at least about 3.5 moles of bromide to 1 mole copper is preferred. The upper limit of this ratio is not critical and molar ratios as high as 6 to 12 or more can be used. Currently preferred molar ratios are 4–6 moles of bromine ions per mole of copper.

The secondary alkylene diamine is generally used in an amount of about 0.4–3 moles per mole of copper, and the tertiary monoamine in an amount of about 10–100 moles, and preferably 20–60 moles, per mole of copper. The secondary monoamine is generally used in an amount up to 3 mole percent based on phenol, with 0.5–2 mole percent being preferred. The phase transfer agent, when present, is typically used in an amount of up to 0.8%, preferably 0.1–0.2%, by weight based on phenol.

In a typical run to prepare polyphenylene oxide by this process the material relationship Cu:DBEDA:DBA:DMBA: 2,6-di-substituted compound would be equal to 1:2:8.5:40:900 (copper content expressed in gram atoms, all other material content in moles).

What is claimed is:

1. In the process for forming polyphenylene ether resin wherein a 2,6-di-substituted phenolic compound is contacted with an oxygen-containing gas in a polymerization medium in the presence of a catalyst to produce oxidative coupling, said catalyst comprising copper ions, bromine ions, a diamine of the formula:

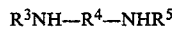

wherein each of $R^3$ and $R^5$ is a secondary or tertiary alkyl group and $R^4$ is a divalent hydrocarbon group and at least two and no more than three carbon atoms separate the two amino nitrogen atoms and the carbon atoms to which the amino nitrogen atoms are attached are aliphatic, and a tertiary amine from the group consisting of N-methylpyrrolidine, triethylenediamine or a trialkylamine wherein at least two of the alkyl groups are methyl and the third is $C_{1-8}$ primary or $C_{3-8}$ secondary alkyl, the improvement comprising
   (a) conducting the oxidative coupling as a continuous process solely in a first and a second continuous stirred tank reactor interconnected in series flow communication, the ratio of gram moles of copper to moles of phenolic compound is in the range of from about 1:400 to about 1:1200,
   (b) passing liquid reaction product formed in said first reactor during a first average reaction time to said second reactor without removing water from said reaction product,
   (c) continuing the oxidative coupling in said second reactor during a second average residence time,
   (d) vigorously stirring the contents of said first and second reactors during the oxidative coupling, the polymerization medium retaining the polyphenylene ether resin formed in solution throughout the total of said first and second average residence times and
   (e) correlating said first and second average residence times such that the intrinsic viscosity of polyphenylene ether resin removed from said second reactor is at least about 0.35 dl/g.

2. The improved process of claim 1 wherein the weight average molecular weight (based on polystyrene calibration) of polyphenylene ether resin formed in the first reactor is at least about 5,000.

3. The improved process of claim 2 wherein the weight average molecular weight (based on polystyrene calibration) of polyphenylene ether resin formed in the first reactor is the product of greater than 95% conversion.

4. The improved process of claim 3 wherein the weight average molecular weight (based on polystyrene calibration) of polyphenylene ether resin formed in the first reactor is at least about 7000.

5. The improved process as defined in claim 1 wherein the reaction proceeds in the presence of a minor quantity of a quaternary ammonium compound.

6. The improved process as defined in claim 1 wherein catalyst and phenolic compound in a quantity of polymerization medium are pre-mixed prior to addition thereof to the first reactor.

7. The improved process of claim 1 wherein the polymerization medium is selected from the group consisting of toluene and benzene.

8. The improved process as defined in claim 1 wherein after leaving the second reactor the polyphenylene ether resin is precipitated by the addition of precipitating agent.

9. The improved process as defined in claim 8 wherein the precipitating agent is methanol.

10. The improved process as defined in claim 1 wherein the phenolic compound is 2,6-xylenol.

11. The improved process as defined in claim 1 wherein in the diamine each of $R^3$ and $R^5$ is isopropyl, a $C_{4-8}$ tertiary alkyl or a cycloalkyl group having no hydrogens on the alphacarbon atom and $R^4$ is $C_{2-4}$ alkylene or $C_{3-7}$-cycloalkylene.

12. The improved process as defined in claim 11 wherein the catalyst contains N,N'-di-t-butylethylenediamine, dimethyl-n-butylamine and di-n-butylamine.

13. The improved process as recited in claim 12 wherein the relationship of copper:N,N'-di-t-butylethylenediamine:di-n-butylamine:dimethyl-n-butylamine:2,6-di-substituted compound is about 1:2:8.5:40:900 (copper content in gram moles, all other content in moles).

14. The improved process as recited in claim 1 wherein a substantially constant temperature in the range of from about 10° to about 60° C. is maintained.

15. The improved process as recited in claim 14 wherein the temperature is in the range of from about 20° to about 55° C.

16. The improved process as recited in claim 15 wherein the temperature is in the range of from about 30° to about 40° C.

* * * * *